(No Model.)
G. S. FOLLANSBEE.
SEALING DEVICE FOR WATER METERS.
No. 404,395. Patented June 4, 1889.
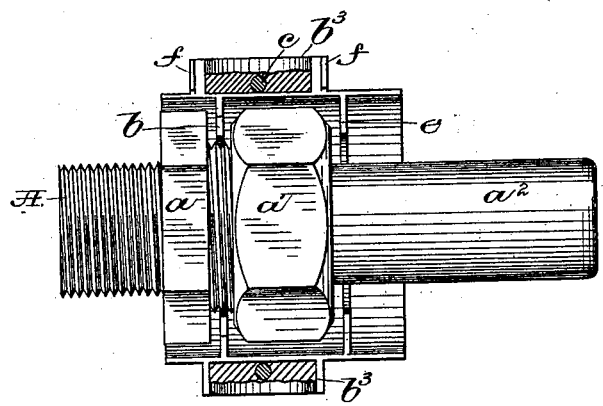
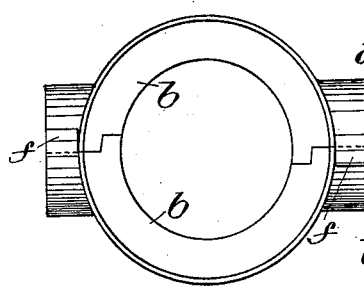
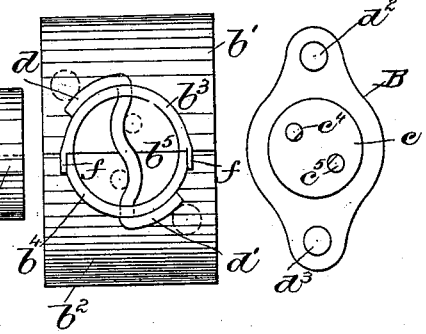
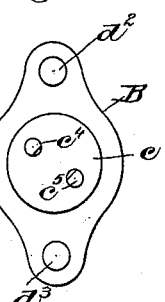
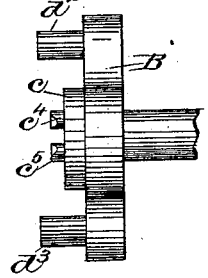
Witnesses.
Howard F. Bates.
Fred L. Emery.
Inventor.
George S. Follansbee
by Crosby & Gregory
Attys.

UNITED STATES PATENT OFFICE.

GEORGE S. FOLLANSBEE, OF BOSTON, MASSACHUSETTS.

SEALING DEVICE FOR WATER-METERS.

SPECIFICATION forming part of Letters Patent No. 404,395, dated June 4, 1889.

Application filed August 6, 1887. Serial No. 246,284. (No model.)

*To all whom it may concern:*

Be it known that I, GEORGE S. FOLLANSBEE, of Boston, county of Suffolk, and State of Massachusetts, have invented an Improvement in Sealing Devices for Water-Meters, of which the following description, in connection with the accompanying drawings, is a specification, like letters on the drawings representing like parts.

This invention relates to a sealing device for pipe-couplings, and is especially adapted for use on water and other meters, it having for its object to provide an efficient and cheap sealing device.

In accordance with my invention the nipple of the meter to which the coupling is attached is provided with a collar, with which co-operates the coupling-nut to form a locking-groove, in which is extended a flange on two parts or halves of a seal or locking device constructed as will be described, so that the coupling-nut is covered and beyond reach until the seal or locking device is removed.

Each half or part of the seal or locking device, as shown, has a semicircular flange, which co-operates when the said halves are put together to form a cup or socket, into which wax or other similar sealing substance is placed. The parts or halves referred to are secured together at top and bottom preferably by independent pieces of wire inserted through holes in the flanges referred to, each wire being bent in the middle in the cup or socket formed by the flanges, and the ends of the said wire being turned in opposite directions by a key, as will be hereinafter described.

The particular features in which my invention consists will be pointed out in the claims at the end of this specification.

Figure 1 shows in section and elevation a coupling provided with my improved seal or locking device, the latter being in section; Fig. 2, a top or plan view of the seal or locking device detached; Fig. 3, an elevation of the key by which the binding-wire is turned, the handle being broken off; Fig. 4, a view of the key, looking to the right in Fig. 3, and Fig. 5 a detail to be referred to.

Referring to Fig. 1, A represents a threaded nipple of a water or other meter. (Not shown.) The nipple A is provided with a collar $a$, with which co-operates the nut $a'$, by which the pipe section or union $a^2$ is united to the nipple, as in the usual manner. The collar $a$ and nut $a'$ form a locking-groove, in which enters an inwardly-projecting flange $b$ on each part or half $b'$ $b^2$ of a cylindrical collar constituting my improved seal or locking device. Each half $b'$ $b^2$ of the said seal or locking device is provided at its opposite ends on its outer side with a flange $b^3$ $b^4$, respectively, which form a cup or socket $b^5$ (see Fig. 2) when the said parts or halves are put together. Each flange $b^3$ $b^4$ has a hole $c$, through which is preferably extended a wire $c'$, by which the halves $b'$ $b^2$ are firmly secured together, the said wire in practice being a straight piece, which is first inserted through the holes in the said flanges so that its ends project beyond, and then are bent or turned by means of a key B.

The key B has a central hub $c^3$, which fits the cup or socket $b^5$, and which is provided with two pins $c^4$ $c^5$, (herein shown on opposite sides of the longitudinal center of the key B,) the said pins acting on opposite sides of the wire to bend the same into substantially the S form shown in Fig. 2, thus preventing the said wire from being pulled through the holes $c$, the ends of the wire projecting beyond the flanges $b'$ $b^2$ being bent in opposite directions, as at $d$ $d'$, by the pins $d^2$ $d^3$, the position occupied by the said pins when the wire has been bent being indicated by dotted lines, Fig. 2. Each half $b'$ $b^2$ has at one side a flange $e$, which forms with the flange $b$ a chamber in which the nut is locked, the flange $e$ projecting beyond the top of the nut, so as to prevent the insertion of pinchers and similar tools by which the nut may be turned. The flange $b$ of each part or half $b'$ $b^2$ is cut away or rabbeted at its ends to form a rabbet-joint, as shown in Fig. 5, when the parts $b'$ $b^2$ are put together, the said rabbet-joint preventing one part from being slipped by the other, thus obviating breaking of the seal by moving one part $b'$ by the other part $b^2$, which might arise from careless handling of the said parts. The upper flange $b^3$ of the part $b'$ and the lower flange $b^4$ of the part $b^2$ are provided with lips $f$, which overlap the ends of the flanges co-operating with them to form the socket or cup $b^5$ when the parts $b'$ $b^2$ are put together, as shown in Figs. 2 and 5, thus preventing the parts $b'$ $b^2$ from being moved laterally independently of each other.

I claim—

1. The combination, with a seal or locking device consisting of two parts $b'$ $b^2$, having flanges $b^3$ $b^4$ and $b$ $e$, the flanges $b'$ having holes $c$, of a fastening device or wire adapted to be inserted through said holes to unite the said parts, substantially as described.

2. The combination, with a seal or locking device consisting of two parts $b'$ $b^2$, having flanges $b^3$ $b^4$ and $b$ $e$, the flanges $b'$ $b^2$ having holes $c$, of a wire inserted through the said holes, and a key to turn or bend said wire, substantially as and for the purpose specified.

3. A seal or locking device for pipe-couplings, consisting of two parts $b'$ $b^2$, provided with flanges $b^3$ $b^4$, having lips $f$ and forming a cup or socket $b^5$, and a flange $b$, provided with a rabbet to prevent movement of the parts $b'$ $b^2$ independent of each other in one direction, substantially as described.

In testimony whereof I have signed my name to this specification in the presence of two subscribing witnesses.

GEORGE S. FOLLANSBEE.

Witnesses:
JAS. H. CHURCHILL,
B. DEWAR.